Patented July 1, 1941

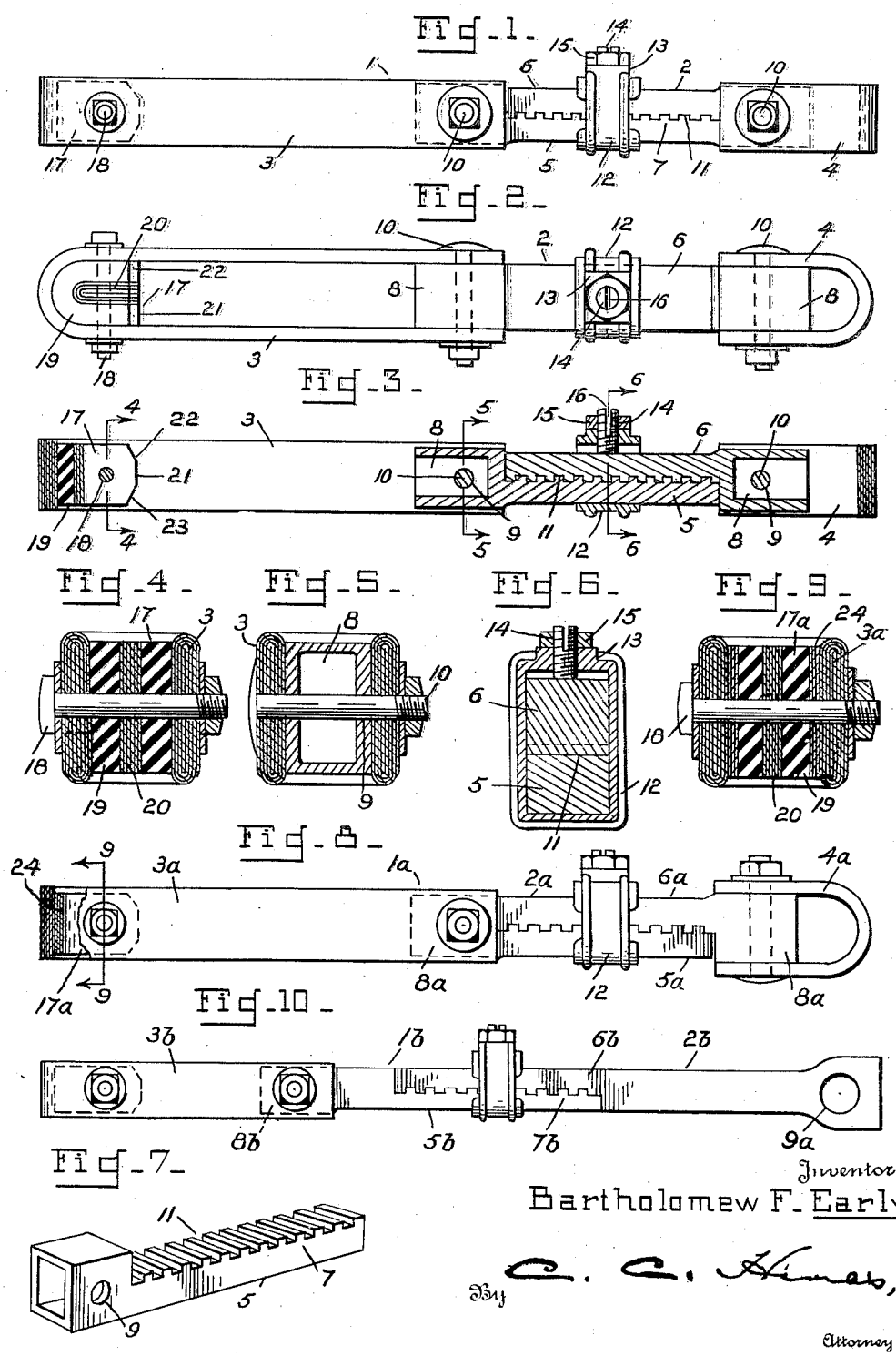

2,247,484

UNITED STATES PATENT OFFICE 2,247,484

LUG CONNECTION FOR LOOMS

Bartholomew F. Early, Lowell, Mass.

Application August 17, 1940, Serial No. 353,137

3 Claims. (Cl. 139—151)

This invention relates to improvements in lug connections for looms such as used between the picker stick and the picker arm or other picker stick actuator of a loom whereby the motion of the actuator is imparted to the picker stick for operating it. More particularly the invention relates to a lug connection of that type including a metallic connecting or coupling bar formed of coupling members, adjustably connected to vary the length of the lug connection as required for service use.

Bar connections of the character described are subjected in use to great strains, jolts and vibrations whereby the parts tend to work loose and become unduly worn, broken or to get out of adjustment, often requiring frequent shutting down of the loom in order to make adjustments or repairs.

To overcome these objections and to furnish couplings as free as possible from them, the tendency is to make the coupling parts of heavy or fairly costly construction, which is also objectionable for working and economical reasons.

One object of my invention is to provide a lug connection which is light in weight but strong and durable in construction.

Another object of my invention is to provide a lug connection which is adjustable as to length and the parts of which when adjusted are adapted to be held firmly connected and prevented from working loose.

Still another object of my invention is to provide a novel and improved lug connection of a type which is suitable for use on different types of looms using different forms or arrangements of picker stick actuators.

Still another object of my invention is to provide a novel form and construction of cushioning or shock absorbing block associated with the picker stick engaging strap whereby wear on the picker stick and strap are reduced and a more effective cushioning or shock absorbing action obtained.

With these and other objects in view, the invention consists of the features of construction, combination and arrangement of parts, hereinafter fully described and claimed, reference being had to the accompanying drawing, in which:—

Fig. 1 is a view in side elevation of a lug connection as designed for use on a Crompton & Knowles loom.

Fig. 2 is a top plan view of the same.

Fig. 3 is a vertical longitudinal section through the lug connection.

Figs. 4, 5 and 6 are cross-sections on lines 4—4, 5—5 and 6—6 of Fig. 3.

Fig. 7 is a perspective view of one of the coupling sections of the rod member.

Fig. 8 is a view similar to Fig. 1 of a lug connection as designed for use on a Draper loom.

Fig. 9 is a cross-section on line 9—9 of Fig. 8.

Fig. 10 is a view similar to Figs. 1 and 8 of a lug connection having one of its coupling members constructed for pivotal connection with the stud of a picker stick actuator.

Referring now more particularly to Figs. 1 to 7, inclusive, of the drawing, 1 designates a lug connection of a type adapted for use on a Crompton & Knowles loom, said connection comprising a rod member 2 and strap members or loops 3 and 4 for respective engagement with the picker stick and picker arm or other picker stick actuator. In this type of lug connection the loops 3 and 4 are similarly arranged at opposite ends of the rods with the passages formed thereby disposed vertically for passage therethrough of the picker stick and picker arm.

In accordance with my invention, the rod member 2 is made of two substantially counter-part coupling sections 5 and 6, each consisting of an inner elongated jaw portion 7 and an outer shank portion 8. These sections 5 and 6 of the rod member are preferably formed of some light, but strong and durable, metal, such as aluminum, duralumin or other aluminum alloy. Also in accordance with my invention the jaw portion 7 of each coupling section is made of solid metal and of rectangular form in cross-section, while its shank portion 8 is made hollow or of rectangular box-like formation. Similar opposed walls of the shank portions 8 of each rod coupling section are formed with openings 9 for the passage of bolts 10 or other like fastenings whereby the free ends of the straps 3 and 4 are secured thereto.

The jaw portions 7 of the rod sections 5 and 6 are of relatively less depth than their shank sections 8, the latter being enlarged with respect thereto, and these jaw sections are adapted to overlap and to be adjustably connected to vary the length of the lug connection as required in service. For this purpose, the opposed inner faces of the jaw portions 7 are provided with longitudinal rows of die cut teeth 11 of rectangular form in cross-section, with the teeth of each row regularly spaced from each other and extending across the jaw portions from side to side thereof, and with the teeth of the jaw rows alternately arranged with relation to each other, so that when the jaw portions are brought together the teeth of one jaw portion will fit between the teeth of the other jaw portion, thereby locking the coupling sections against longitudinal displacement.

In order to hold the jaw portions against relative separating movement, a metallic clamp 12 is provided. This clamp is of a form to snugly embrace the coupled jaw portions 7 and to be slidably shifted thereon to permit assemblage, disassemblage and adjustment of these parts. One of the walls, preferably the upper wall of this clamp, is provided with a seat boss 13, through which wall and boss extend a threaded opening for passage of a clamping screw 14. This screw has an inner end portion adapted to bear against the outer surface of the jaw portion of one coupling section to draw the opposed wall of the clamp against the outer surface of the jaw portion of the other coupling section. The outer end of this screw, which receives a lock nut 15, which bears against the seat 13, is forked, split or longitudinally slotted, as at 16, to provide spring jaws to hold the nut against retrograde rotation and also to provide a niche for the engagement with the screw of a screwdriver or other like tool, whereby the screw may be tightened and loosened whenever it is desired to apply or remove the clamp. By this construction of the jaw portions and their holding means, the connecting rod may be adjusted to any length desired for service use, and when adjusted and fastened by the clamp will be held firmly from any possibility of disconnection. The described construction of the jaws and construction of the clamping screw, which provides for the firm holding of the screw in clamping position, ensures a secure connection of the parts of the lug connection so that frequent shutting down of the loom from parts of the lug connection becoming loose, commonly occurring with lug connections of ordinary type, will be effectually avoided. The construction of the screw for use in association with a lock nut reduces liability of loosening of the screw or nut to a maximum extent, and avoids the well known objections incident to the use of ordinary headed screws.

The straps 3 and 4 may be made of leather, canvas, ducking or any strong and durable multiply fabric. The free ends of these straps are arranged to bear against the flat sides of the shank members so as to be firmly clamped and held in position by the fastening bolts 10. By making the jaw and shank portions of each rod section of unitary formation, the number of parts forming the connecting rod is reduced to the minimum, and by making the jaw portions of solid metal and of rectangular form in cross-section jaws of great strength are provided on which strong and durable engaging teeth may be formed which are not liable to be broken or damaged in the use of the connection. The shank portions 8 of the coupling members are made of hollow type or box form to provide for the effective clamping engagement of the strap members therewith and also to enable the weight of the rod connection to be reduced. By this means an all metal rod connection of great strength and durability to withstand the great strains, jolts and vibrations in the loom action is produced, and one which is at the same time of a satisfactorily light weight so as to avoid clumsiness of construction and heaviness imposing greater strains on the working parts or requiring the use of greater power in the operation of the loom mechanism.

The straps 3 and 4 are made of suitable lengths for engagement with the picker stick and its actuator and to allow proper rebound of the picker stick. For the purpose of cushioning the rebound of the stick and providing for an effective engagement between the stick and the loop 3, this loop 3 is provided at its outer end with a cushioning or shock absorbing block 17 secured to the strap by means of a bolt or other suitable fastening 18. This block is of novel construction, comprising a U-shaped body portion 19 of a durable rubber in which is fitted a filler or insert 20 composed of U-shaped folds or plies of a strong and durable fabric, providing a composite structure having strength and durability while adapted to give the desired cushioning action. The inner or contact surface of the block is of novel form, said block having a central face 21 arranged vertically or perpendicularly to the plane of the lug connection and upper and lower obliquely disposed or inclined faces 22 and 23, which diverge with relation to each other so that flat abutment or contact faces for engagement with the picker stick in its vertical and oppositely swung positions are provided, whereby a better cushioning action is secured and wear and tear on both the stick and block appreciably reduced.

Fig. 8 shows a slightly modified form of lug connection 1a in which the rod member 2a is designed for use with a Draper loom, in which the picker stick and picker arm straps 3a and 4a are arranged at right angles to each other. The coupling sections 5a and 6a of this rod member are similar in construction to those shown in Figs. 1 and 7, inclusive, except that the shank portions 8a thereof are arranged at right angles to each other to adapt the straps to be arranged in the manner described. This construction of the lug connection also shows a slightly modified form of the cushioning block 17a in which the block is provided with an outer fabric facing 24 contacting the strap 3a. Otherwise the construction of this form of the invention is the same as that disclosed in Figs. 1 to 7, inclusive.

Fig. 10 shows a lug connection 1b having a rod member 2b and a picker stick strap engaging member 3b. The rod member 2b comprises coupling sections 5b and 6b each having a jaw portion 7b and a shank portion 8b. The shank portion 8b of the rod section to which the strap 3b is attached is or may be similar in construction to the shank portion of the strap engaging members of the lug connections 1a and 1b, but the shank portion of the rod section 6b is of somewhat different form and enlarged relatively to the shank portion of the section 5b and is provided with enlarged openings 9a for the reception of a bushing or other means for pivotally connecting the same with the stud of a picker stick actuator of that type which is pivotally connected directly with the lug connection. Otherwise the structure of the lug connection 1b is the same in all general respects as that of the lug connections 1 and 1a.

From the foregoing description, taken in connection with the drawing, the construction and mode of application of my improved lug connection for looms will be readily understood, and it will be seen that the invention provides a lug connection having manifold advantages in point of strength, durability, adjustability to suit different looms and lightness in weight so that it will not impose a drag on the working parts of the loom which it connects. Also it will be seen that the invention, with slight changes in form or construction of its parts, is adapted for use on different types of looms, and that, for all uses, many of the parts are of the same form and interchangeable with each other, allowing great economy of manufacture and greater ease and reduction of the cost in making repairs or renewing worn parts. While the forms of construction herein disclosed are preferred, it will, of course, be understood that changes in the form, construction and arrangement of the parts, within the scope of the appended claims, may be made without departing from the spirit or sacrificing any of the advantages of the invention.

What I claim is:

1. A lug connection for looms comprising a connecting bar formed of a pair of metallic coupling members each having a solid rectangular jaw portion and a rectangular shank portion, said jaw portions being arranged in superposed and overlapping relationship and the opposed relatively upper and lower faces of said jaw portions being provided with longitudinal rows of interlocking teeth, and said shank portions being formed with openings for passage of fastening members to connect the respective coupling members with picker stick and actuator engaging elements, a clamping sleeve slidably embracing the solid jaw portions of the coupling members, and a set screw carried by said sleeve and engageable with one of the jaw portions for clamping the jaw portions and sleeve together.

2. A lug connection for looms comprising a connecting bar formed of a pair of metallic coupling members each having a solid rectangular jaw portion and a rectangular shank portion, said jaw portions being arranged in superposed and overlapping relationship and the opposed relatively upper and lower faces of said jaw portions being provided with longitudinal rows of interlocking teeth, and said shank portions being formed with openings for passage of fastening members to connect the respective coupling members with picker stick and actuator engaging elements, a clamp slidably embracing the jaw portions, a set screw carried by the clamp and engageable with one of the jaw portions for fastening the same and having a headless end forked to provide resilient portions and a screw driver niche, and a lock nut engaging the forked end of the screw and locked thereby in clamping position.

3. A lug connection for looms comprising a connecting bar formed of a pair of metallic coupling members each having a solid rectangular jaw portion and a relatively enlarged rectangular shank portion, said jaw portions being arranged in superposed and overlapping relationship and the opposed relatively upper and lower faces of said jaw portions being provided with longitudinal rows of interlocking teeth extending transversely from side to side thereof and each of rectangular formation, and said shank portions being formed with openings for passage of fastening members to connect the respective coupling members with picker stick and actuator engaging elements, a clamp slidably embracing the jaw portions, a set screw carried by the clamp and engageable with one of the jaw portions for fastening the same and having a headless end forked to provide resilient portions and a screw driver niche, and a lock nut engaging the forked end of the screw and locked thereby in clamping position.

BARTHOLOMEW F. EARLY.